US 7,776,786 B2

(12) United States Patent
DiFrancesco et al.

(10) Patent No.: US 7,776,786 B2
(45) Date of Patent: *Aug. 17, 2010

(54) CATALYST SYSTEMS ADVANTAGEOUS FOR HIGH PARTICULATE MATTER ENVIRONMENTS

(75) Inventors: Chris E. DiFrancesco, Durham, NC (US); Thomas W. Hastings, Raleigh, NC (US); Edward F. Kassmann, Chapel Hill, NC (US); Christian Trefzger, Durham, NC (US)

(73) Assignee: Cormetech, Inc., Durham, NC (US)

( * ) Notice: Subject to any disclaimer, the term of this patent is extended or adjusted under 35 U.S.C. 154(b) by 331 days.

This patent is subject to a terminal disclaimer.

(21) Appl. No.: 11/122,261

(22) Filed: May 4, 2005

(65) Prior Publication Data
US 2005/0255021 A1 Nov. 17, 2005

Related U.S. Application Data

(60) Provisional application No. 60/567,884, filed on May 4, 2004.

(51) Int. Cl.
*B01J 21/04* (2006.01)
*B01J 23/02* (2006.01)
(52) U.S. Cl. ............. 502/439; 502/527.11; 502/527.14; 502/527.15; 502/527.16; 502/527.17; 502/527.18; 502/527.24; 502/527.19
(58) Field of Classification Search ................. 502/439, 502/527.11, 527.12, 527.13, 527.14, 527.15, 502/527.16, 527.17, 527.18, 527.19, 527.2, 502/527.21, 527.22, 527.23; 423/239.1
See application file for complete search history.

(56) References Cited

U.S. PATENT DOCUMENTS

| 4,071,324 A | | 1/1978 | Reid |
| 4,307,068 A | | 12/1981 | Matsumoto et al. |
| 4,335,023 A | * | 6/1982 | Dettling et al. ............. 502/262 |
| 4,472,358 A | | 9/1984 | Khudenko |
| 4,758,410 A | | 7/1988 | Grimm et al. |
| 4,833,115 A | * | 5/1989 | Koschlig et al. ............ 502/439 |

(Continued)

FOREIGN PATENT DOCUMENTS

DE 42 15 481 11/1993

(Continued)

OTHER PUBLICATIONS

Hums, "Is Advanced SCR Technology at a Standstill? A Provocatation for the Academic Community and Catalyst Manufacturers," Catalyst Today, 1998, 42(1): 25-35.

(Continued)

*Primary Examiner*—Jerry Lorengo
*Assistant Examiner*—Jennifer A Smith
(74) *Attorney, Agent, or Firm*—J. Clinton Wimbish; Kilpatrick Stockton LLP (57) ABSTRACT

The present invention provides monolithic structural catalysts. The catalysts have a high open frontal area structure and composition advantageous for use in high particulate matter environments such as coal-fired industrial applications. In an embodiment, the present invention provides a monolithic structural catalyst body comprising a high open frontal area structure and composition that can achieve an efficient selective reduction of nitrogen oxides while minimizing the oxidation of sulfur dioxide wherein the structure of the catalyst body is resistant to plugging by particulate matter.

27 Claims, 2 Drawing Sheets

U.S. PATENT DOCUMENTS

| | | | |
|---|---|---|---|
| 4,904,633 A * | 2/1990 | Ohata et al. | 502/304 |
| 5,076,908 A | 12/1991 | Strangeland et al. | |
| 5,102,634 A * | 4/1992 | Hayashi et al. | 423/210 |
| 5,387,399 A | 2/1995 | Nishida et al. | |
| 5,449,501 A | 9/1995 | Luebke et al. | |
| 5,494,881 A * | 2/1996 | Machida et al. | 502/439 |
| 5,505,910 A | 4/1996 | Nishida et al. | |
| 5,601,798 A * | 2/1997 | Cooper et al. | 423/700 |
| 5,629,067 A * | 5/1997 | Kotani et al. | 428/116 |
| 5,916,529 A | 6/1999 | Scheuerman | |
| 6,156,277 A | 12/2000 | Leibacher et al. | |
| 6,159,578 A * | 12/2000 | Ichikawa | 428/118 |
| 6,299,845 B1 | 10/2001 | Romatier et al. | |
| 6,852,302 B1 | 2/2005 | Ukai et al. | |
| 6,863,868 B1 | 3/2005 | Alvin | |
| 2002/0053202 A1* | 5/2002 | Akama et al. | 60/297 |
| 2003/0086846 A1 | 5/2003 | Adusei et al. | |
| 2004/0060239 A1 | 4/2004 | Rostrup-Nielsen et al. | |
| 2005/0202971 A1* | 9/2005 | DiFrancesco et al. | 502/439 |
| 2005/0255021 A1* | 11/2005 | DiFrancesco et al. | 423/239.1 |

FOREIGN PATENT DOCUMENTS

| | | |
|---|---|---|
| EP | 0 516 262 | 12/1992 |
| EP | 631805 A1 * | 1/1995 |
| EP | 0 636 410 | 2/1995 |
| EP | 1 063 002 | 12/2000 |
| GB | 1 146 736 | 3/1969 |
| JP | 56113349 | 9/1981 |
| JP | 61024168 | 2/1986 |
| JP | 01306710 | 12/1989 |
| JP | 06018018 | 1/1994 |
| JP | 11022924 | 1/1999 |
| JP | 11207172 | 8/1999 |
| JP | 02239345 | 8/2002 |
| JP | 04162641 | 6/2004 |
| WO | WO 95/03887 A1 | 2/1995 |

OTHER PUBLICATIONS

Lefers et al, "Modeling of Selective Catalytic Denox Reactors," Chemical Engineering and Technology, 1991, 14(3): 192-200.

Oxidation Catalyst, as printed from http://www.catalystproducts.com/12128/13052.html on Feb. 5, 2008.

Written Opinion of the International Searching Authority mailed Aug. 25, 2005 for Patent Cooperation Treaty Serial No. PCT/US2005/006287.

Improved Catalyst Can Clear the Air, Power Engineering, May 2006 Edition, 4 pages.

* cited by examiner

FIGURE 1

FIGURE 2

US 7,776,786 B2

CATALYST SYSTEMS ADVANTAGEOUS FOR HIGH PARTICULATE MATTER ENVIRONMENTS

CROSS-REFERENCE TO RELATED APPLICATIONS

The present application for patent claims priority to U.S. Provisional Patent Application Ser. No. 60/567,884, filed May 4, 2004 and entitled "Catalyst Systems Advantageous for High Particulate Matter Environments", which is hereby incorporated in full by reference.

FIELD OF INVENTION

The present invention relates generally to catalyst compositions. An embodiment of the present invention provides a monolithic structural catalyst body advantageous for use in high particulate matter environments such as those produced in coal-fired industrial applications.

BACKGROUND OF THE INVENTION

The high toxicity of nitrogen oxides and their role in the formation of acid rain and tropospheric ozone have resulted in the imposition of strict standards limiting the discharges of these chemical species. To meet these standards, it is generally necessary to remove at least part of these oxides present in the exhaust gases from stationary or mobile combustion sources.

Denitration or selective catalytic reduction (SCR) technology is commonly applied to combustion-derived flue gases for removal of nitrogen oxides. The denitration reaction comprises the reaction of nitrogen oxide species in the gases, such as nitrogen oxide (NO) or nitrogen dioxide ($NO_2$), with a nitrogen containing reductant, such as ammonia or urea, resulting in the production of diatomic nitrogen ($N_2$) and water.

In addition to nitrogen oxides, sulfur dioxide ($SO_2$) is a chemical species often present in combustion-flue gases that causes great environmental concern. Sulfur dioxide that is present in fossil fuel combustion flue-gases is partly oxidized to sulfur trioxide ($SO_3$) which reacts with water to form sulfuric acid. The formation of sulfuric acid from the oxidation of sulfur dioxide in combustion flue-gases can increase corrosion problems in downstream equipment, can increase power costs associated with air pre-heaters due to the increased temperature required to keep the acid-containing flue-gas above its dew point, and can cause increased opacity in the stack gases emitted to the atmosphere.

Catalyst systems for the removal of nitrogen oxides can increase the amount of sulfur dioxide oxidation since the catalytic material utilized in selective catalytic reduction can additionally effectuate the oxidation of sulfur dioxide. As a result, the reduction in the nitrogen oxide content of a combustion flue-gas can have an undesirable side-effect of increasing $SO_3$ formation in the combustion flue-gas.

Combustion flue-gases containing nitrogen oxides and a significant sulfur dioxide content are commonly produced from the combustion of coal. Coal-fired combustion flue-gases contain high amounts of particulate matter, especially in the form of ash. This particulate matter has the ability to clog the cells of a monolithic structural catalyst body resulting in a reduced catalytic performance and efficiency. Individual ash particles alone can plug catalyst cells or ash particles can aggregate to produce a plug. Moreover, smaller particulate matter can plug catalytic pores located within inner partition walls of the catalyst body.

It would be desirable to provide a monolithic structural catalyst body comprising a high open frontal area (OFA) catalyst structure and composition that demonstrates a superior utilization of catalyst activity for the selective reduction of nitrogen oxides while minimizing the oxidation of sulfur dioxide wherein the catalyst structure resists plugging by particulate matter.

SUMMARY OF THE INVENTION

The present invention provides monolithic structural catalysts that provide advantages over heretofore utilized and suggested catalysts.

In an embodiment of the present invention, a monolithic structural catalyst body comprises a cell opening of at least 5.5 mm and an aggregate lot average areal catalyst weight density ranging from about 200 $g/m^2$ to about 640 $g/m^2$ wherein less than 8% of the total pore volume is in pores having a diameter greater than 8,000 Angstroms.

In another embodiment of the present invention, a monolithic structural catalyst body comprises a cell opening of at least 5.5 mm; and an areal catalyst weight density ranging from about 200 $g/m^2$ to about 625 $g/m^2$ wherein less than 8% of the total pore volume is in pores having a diameter greater than 8,000 Angstroms.

In another embodiment of the present invention, a monolithic structural catalyst body comprises a cell opening size of at least 5.5 mm, an areal catalyst weight density ranging from about 200 $g/m^2$ to about 800 $g/m^2$, and an open frontal area greater than 80% wherein the structural catalyst body has a cell density of at least 2.05 cells/$cm^2$ and wherein less than 8% of the total pore volume is in pores having a diameter greater than 8,000 Angstroms. In some embodiments, a monolithic structural catalyst body of the present invention comprises an open frontal area greater than or equal to 82%.

In another embodiment of the present invention, a monolithic structural catalyst body comprises a cell opening size of at least 6.0 mm, an aggregate lot average areal catalyst weight density ranging from about 200 $g/m^2$ to about 625 $g/m^2$ wherein less than 8% of the total pore volume is in pores having a diameter greater than 8,000 Angstroms.

One feature and advantage of the present invention is that an embodiment of a catalyst body of the present invention may weigh less than heretofore known catalyst bodies while achieving similar catalytic activity.

Another feature and advantage of the present invention is that an embodiment of a catalyst body of the present invention displays a reduced oxidation of sulfur dioxide.

Another feature and advantage of the present invention is than en embodiment of a catalyst body of the present invention displays a reduced pressure drop for fluid flow through the catalyst body.

A further feature and advantage of the present invention is that an embodiment of a catalyst body of the present invention is resistant to plugging and erosion by particulate matter contained in a fluid flowing through the catalyst body.

With the foregoing and other advantages and features of the invention that will become hereinafter apparent, the nature of the invention may be more clearly understood by reference to the following non-limiting detailed description of the invention and the several views illustrated in the drawings.

DETAILED DESCRIPTION OF THE INVENTION

The present invention provides monolithic structural catalyst bodies comprising a high open frontal area catalyst structure and composition that can achieve an efficient selective catalytic reduction of nitrogen oxides while minimizing the oxidation of sulfur dioxide wherein the structure of the catalyst body is resistant to plugging by particulate matter. Moreover, the catalyst bodies of the present invention demonstrate adequate mechanical strength for use in commercial and industrial applications. The catalyst bodies may be advantageously used for conducting reactions in gaseous or liquid flow streams that are brought into contact with the active catalytic ingredients of the high open frontal area structural catalyst bodies, such as the selective catalytic reduction of nitrogen oxides. Moreover, the present invention provides methods for the selective catalytic reduction of nitrogen oxides in a gas.

Catalyst bodies of the present invention may comprise an outer peripheral wall and a plurality of inner partition walls arranged within the outer peripheral wall. The inner partition walls define a cell opening size and delineate a plurality of flow channels, which extend longitudinally through the catalyst body. As used herein with reference to the inner partition wall, thickness refers to the thickness upon formation of the catalyst body not including any additional catalytic material deposited thereon or increased or decreased thickness resulting from use for an intended purpose. The outer peripheral and inner partition walls may be formed from a chemical composition containing a catalytically active material. The formation of inner partition walls from a chemical composition containing catalyst material precludes the need to deposit catalyst material on catalytically inactive outer peripheral and inner partition walls as suggested in U.S. Pat. No. 5,494,881 to Machida et al. the disclosure of which is hereby incorporated herein by reference. In an embodiment of the present invention, however, the outer peripheral and inner partition walls are formed from a chemical composition containing catalytically active material and the walls further comprise deposited catalytically active material. In another embodiment, the deposited catalytically active material or materials may be deposited within portions of the catalytic structural body, such as end coatings. In another embodiment, the deposited catalytically active materials may be deposited in successive layers on the catalytic structural body. In still another embodiment, the deposited catalytically active materials may be different from each other and different from the catalytic material that comprises the outer peripheral and inner partition walls.

In an embodiment, the present invention provides a catalyst comprising a high open frontal area catalyst structure having an areal catalyst weight density for efficient selective catalytic reduction of nitrogen oxides with a minimization of sulfur dioxide oxidation wherein the cell opening size and pore size distribution are resistant to plugging by particulate matter in the fluid contacting the catalyst body. In more detail, the catalyst can comprise an areal catalyst weight density ranging from about 200 g/m² to about 800 g/m². In a further embodiment, the catalyst can comprise an areal catalyst weight density ranging from about 200 g/m² to about 625 g/m². The areal catalyst weight density is equal to the mass of the monolithic structural catalyst body per unit geometric surface area. The areal catalyst weight density or mass per unit geometric surface area may be computed directly as the mass of the monolithic structural catalyst body divided by the geometric surface area of the monolithic structural catalyst body. The geometric surface area is equal to the perimeter of the flow channels times the length of the flow channels multiplied by the number of flow channels contained within the structural catalytic body.

In another embodiment, the present invention provides a catalyst comprising a high open frontal area catalyst structure having an aggregate lot average areal catalyst weight density for efficient selective catalytic reduction of nitrogen oxides with a minimization of sulfur dioxide oxidation wherein the cell opening size and pore size distribution are resistant to plugging by particulate matter. The catalyst can comprise an aggregate lot average catalyst weight density ranging from about 200 g/m² to about 640 g/m². The aggregate lot average areal catalyst weight density is reported in the case where a quantity of catalyst has been made in full-scale manufacturing equipment in a quantity of greater than or equal to one cubic meter, such quantity being referred herein as an aggregate lot that comprises the entire operating campaign in the full-scale facilities. For catalyst lots made in full-scale manufacturing equipment, samples of monolithic structural catalyst bodies are obtained at some convenient frequency for the determination of individual values of physical and chemical properties and their variation, including the areal weight density of the individual samples, such frequency being often enough to result in accurate average property measurements rather than measuring every single catalyst body made during the full-scale operations. The aggregate lot average areal weight density of a catalyst lot of bulk volume greater than one cubic meter made in full-scale equipment is equal to the average of the values of the areal weight densities of the individual lot samples that were obtained during the operation of the full-scale manufacturing equipment using a suitable sampling frequency.

In one aspect, the present invention provides monolithic structural catalyst bodies comprising a uniform chemical composition comprising 50-99.9% by weight an inorganic oxide composition and at least 0.1% by weight a catalytically active metal functional group. In other embodiments the uniform chemical composition may comprise 70-95%, by weight, the inorganic oxide composition. In these or other embodiments the catalytically active metal functional group may comprise 1-30%, by weight of the structural catalyst body, typically 5-15%, by weight. The uniform chemical composition may further comprise fillers, reinforcement agents, and the like, as discussed herein. The inorganic oxide composition includes, but is not limited to, titania ($TiO_2$), alumina ($Al_2O_3$), zirconia ($ZrO_2$), and/or mixtures thereof. Moreover, the catalytically active metal functional group includes, but is not limited to, vanadium pentoxide ($V_2O_5$), tungsten oxide ($WO_3$), molybdenum oxide ($MoO_3$), promoted titanium (Ti) species and/or mixtures thereof.

The catalyst body may additionally comprise a catalytically active outer peripheral wall comprising the uniform chemical composition and a plurality of catalytically active inner partition walls comprising the uniform chemical composition. The inner partition walls are arranged within the outer peripheral wall. Moreover, the inner partition walls define the cell opening size and delineate a plurality of flow channels, which extend longitudinally through the monolithic structural catalyst body.

In an embodiment, the present invention provides catalyst bodies comprising a cell opening size of at least 5.5 mm. In another embodiment, the present invention provides catalyst bodies comprising a cell opening size of at least 6.0 mm. Catalyst bodies of the present invention may additionally comprise hydraulic diameter of at least 145 mm and a transverse compressive strength of at least 1.5 kg/cm². In a further embodiment, the hydraulic diameter can range from 145 mm to 160 mm. In a still further embodiment the hydraulic diameter can range from 152 mm to 154 mm.

In another embodiment, the present invention provides catalyst bodies comprising an open frontal area greater than 80%. In a further embodiment, the catalyst body comprises a cell density of at least 2.05 cells/cm². In some embodiments, the present invention provides catalyst bodies comprising a macroporosity greater than 0.05 cc/g in pores of diameter ranging from 600 to 5,000 Angstroms. Moreover, in some embodiments the cell opening size can be at least 6.3 mm. In some embodiments, the present invention provides monolithic structural catalyst bodies comprising an open frontal area greater than or equal to 82%.

In another aspect, the present invention provides a method for the selective catalytic reduction of nitrogen oxides in a fluid comprising flowing the fluid through a catalyst body of the present invention, wherein the fluid comprises a gas or liquid. In more detail, an embodiment of a method of the present invention comprises flowing a fluid through a monolithic structural catalyst body comprising a uniform chemical composition comprising 50-99.9% by weight an inorganic oxide composition and at least 0.1% by weight a catalytically active metal functional group. The inorganic oxide support composition includes, but is not limited to, titania ($TiO_2$), alumina ($Al_2O_3$), zirconia ($ZrO_2$), and/or mixtures thereof. Moreover, the catalytically active metal functional group includes, but is not limited to, vanadium pentoxide ($V_2O_5$), tungsten oxide ($WO_3$), molybdenum oxide ($MoO_3$), promoted titanium (Ti) species, and/or mixtures thereof. The catalyst body additionally comprises an areal catalyst weight density or aggregate lot average areal catalyst weight density suitable for minimizing sulfur dioxide oxidation and a cell opening of at least 5.5 mm wherein less than 8% of the total pore volume is in pores having a diameter greater than 8,000 Angstroms.

Reference is made below to specific embodiments of the present invention. Each embodiment is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment may be incorporated into another embodiment to yield a further embodiment. Thus, it is intended that the present invention cover such modifications and variations as come within the scope of the appended claims and their equivalents.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary, depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10, as well as all ranges beginning and ending within the end points, e.g., 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In an embodiment, a monolithic structural catalyst body of the present invention comprises a uniform chemical composition comprising 50-99.9% by weight an inorganic oxide composition and at least 0.1% by weight a catalytically active metal functional group; a cell opening size of at least 5.5 mm; and an aggregate lot average areal catalyst weight density ranging from about 200 g/m² to about 640 g/m² wherein less than 8% of the total pore volume is in pores having a diameter greater than 8,000 Angstroms; and wherein the structural catalyst body has at least one of the following characteristics: a hydraulic diameter of at least 145 mm; a transverse compressive strength of at least 1.5 kg/cm²; or a macroporosity greater than 0.05 cc/g in pores of diameter ranging from 600 to 5,000 Angstroms.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 5.5 mm; and an aggregate lot average areal catalyst weight density ranging from about 200 g/m² to about 640 g/m² wherein less than 8% of the total pore volume is in pores having a diameter greater than 8,000 Angstroms. The monolithic structural catalyst body can additionally comprise a hydraulic diameter of at least 145 mm and a transverse compressive strength of at least 1.5 kg/cm². The monolithic structural catalyst body can further comprise a macroporosity greater than 0.05 cc/g in pores of diameter ranging from 600 to 5,000 Angstroms. In other embodiments, the hydraulic diameter can range from 152 mm to 154 mm.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 5.5 mm; a transverse compressive strength of at least 1.5 kg/cm²; and an aggregate lot average areal catalyst weight density ranging from about 200 g/m² to about 640 g/m² wherein less than 8% of the total pore volume is in pores having a diameter greater than 8,000 Angstroms.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 5.5 mm; and an areal catalyst weight density ranging from about 200 g/m² to about 625 g/m²; wherein less than 8% of the total pore volume is in pores having a diameter greater than 8,000 Angstroms. The monolithic structural catalyst body of the present embodiment may further comprise a hydraulic diameter of at least 145 mm. The hydraulic diameter can additionally range from 152 mm to 154 mm. The structural catalyst body may additionally comprise a transverse compressive strength of at least 1.5 kg/cm$^2$ and/or a macroporosity greater than 0.05 cc/g in pores of diameter ranging from 600 to 5,000 Angstroms. In another embodiment, the areal catalyst weight density can also range from about 200 g/m$^2$ to about 600 g/m$^2$.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 6.0 mm; and an areal catalyst weight density ranging from about 200 g/m$^2$ to about 625 g/m$^2$; wherein less than 8% of the total pore volume is in pores having a diameter greater than 8,000 Angstroms. The monolithic structural catalyst body of the present embodiment may further comprise a hydraulic diameter of at least 145 mm. The hydraulic diameter can additionally range from 152 mm to 154 mm. The structural catalyst body may additionally comprise a transverse compressive strength of at least 1.5 kg/cm$^2$ and a macroporosity greater than 0.05 cc/g in pores of diameter ranging from 600 to 5,000 Angstroms. In another embodiment, the areal catalyst weight density can also range from about 200 g/m$^2$ to about 600 g/m$^2$.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 5.5 mm; and an areal catalyst weight density ranging from about 200 g/m$^2$ to about 625 g/m$^2$; wherein less than 8% of the total pore volume is in pores having a diameter greater than 8,000 Angstroms; and wherein the monolithic structural catalyst body comprises at least one of the following characteristics: a hydraulic diameter of at least 145 mm, a transverse compressive strength of at least 1.5 kg/cm$^2$, or a macroporosity greater than 0.05 cc/g in pores of diameter ranging from 600 to 5,000 Angstroms.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 5.5 mm, an open frontal area greater than 80% wherein the structural catalyst body has a cell density of at least 2.05 cells/cm$^2$; and an areal catalyst weight density ranging from about 200 g/m$^2$ to about 800 g/m$^2$ wherein less than 8% of the total pore volume is in pores having a diameter greater than 8,000 Angstroms. The monolithic structural catalyst body of the present embodiment may further comprise a hydraulic diameter of at least 145 mm. The hydraulic diameter can additionally range from 152 mm to 154 mm. The structural catalyst body may further comprise a transverse compressive strength of at least 1.5 kg/cm$^2$ and/or a macroporosity greater than 0.05 cc/g in pores of diameter ranging from 600 to 5,000 Angstroms. In some embodiments, the areal catalyst weight density can range from about 200 g/m$^2$ to about 750 g/m$^2$. In other embodiments, the areal catalyst weight density can range from about 200 g/m$^2$ to about 700 g/m$^2$.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 6.0 mm, an open frontal area greater than 80%; and an areal catalyst weight density ranging from about 200 g/m$^2$ to about 800 g/m$^2$ wherein less than 8% of the total pore volume is in pores having a diameter greater than 8,000 Angstroms. The monolithic structural catalyst body of the present embodiment may further comprise a hydraulic diameter of at least 145 mm. The hydraulic diameter can additionally range from 152 mm to 154 mm. The structural catalyst body may further comprise a transverse compressive strength of at least 1.5 kg/cm$^2$ and a macroporosity greater than 0.05 cc/g in pores of diameter ranging from 600 to 5,000 Angstroms. In some embodiments, the areal catalyst weight density can range from about 200 g/m$^2$ to about 750 g/m$^2$. In other embodiments, the areal catalyst weight density can range from about 200 g/m$^2$ to about 700 g/m$^2$. In some embodiments, the areal catalyst weight density can range from about 200 g/m$^2$ to about 625 g/m$^2$. In some embodiments, the structural catalyst body of the present invention comprises an open frontal area greater than or equal to 82%.

In another embodiment, the monolithic structural catalyst body of the present invention comprises a uniform chemical composition comprising 50-99.9% by weight an inorganic oxide composition and at least 0.1% by weight a catalytically active metal functional group; a cell opening size of at least 5.5 mm, an open frontal area greater than 80%; and an areal catalyst weight density ranging from about 200 g/m$^2$ to about 800 g/m$^2$ wherein less than 8% of the total pore volume is in pores having a diameter greater than 8,000 Angstroms; and wherein the monolithic structural catalyst comprises at least one of the following characteristics: a hydraulic diameter of at least 145 mm, a transverse compressive strength of at least 1.5 kg/cm$^2$, or a macroporosity greater than 0.05 cc/g in pores of diameter ranging from 600 to 5,000 Angstroms.

As explained herein, further embodiments of any of the foregoing monolithic structural catalyst bodies may further comprise additional deposited catalytic material. In an embodiment, the monolithic structural catalyst body of the present invention comprises a uniform chemical composition comprising 50-99.9% by weight an inorganic oxide composition and at least 0.1% by weight a catalytically active metal functional group; additional deposited catalytic material; a cell opening size of at least 5.5 mm; and an aggregate lot average areal catalyst weight density ranging from about 200 g/m$^2$ to about 640 g/m$^2$ wherein less than 8% of the total pore volume is in pores having a diameter greater than 8,000 Angstroms. The monolithic structural catalyst body of the present embodiment may further comprise any one or any combination of the following characteristics: a hydraulic diameter of at least 145 mm, a transverse compressive strength of at least 1.5 kg/cm$^2$, or a macroporosity greater than 0.05 cc/g in pores of diameter ranging from 600 to 5,000 Angstroms.

In another embodiment the monolithic structural catalyst body of the present invention comprises a uniform chemical composition comprising 50-99.9% by weight an inorganic oxide composition and at least 0.1% by weight a catalytically active metal functional group; additional deposited catalytic material; a cell opening size of at least 6.0 mm; and an areal catalyst weight density ranging from about 200 g/m$^2$ to about 625 g/m$^2$ wherein less than 8% of the total pore volume is in pores having a diameter greater than 8,000 Angstroms. The monolithic structural catalyst body of the present embodiment may further comprise any one or any combination of the following characteristics: a hydraulic diameter of at least 145 mm, a transverse compressive strength of at least 1.5 kg/cm$^2$, or a macroporosity greater than 0.05 cc/g in pores of diameter ranging from 600 to 5,000 Angstroms. In some embodiments, the monolithic structural catalyst body of the present can comprise an open frontal area greater than or equal to 82%.

In another embodiment, the monolithic structural catalyst body of the present invention comprises a uniform chemical composition comprising 50-99.9% by weight an inorganic oxide composition and at least 0.1% by weight a catalytically active metal functional group; additional deposited catalytic material; a cell opening size of at least 6.0 mm; an open frontal area greater than 80%; and an areal catalyst weight density ranging from about 200 g/m$^2$ to about 800 g/m$^2$ wherein less than 8% of the total pore volume is in pores having a diameter greater than 8,000 Angstroms. The monolithic structural catalyst body of the present embodiment may further comprise any one or any combination of the following characteristics: a hydraulic diameter of at least 145 mm, a transverse compressive strength of at least 1.5 kg/cm$^2$, or a macroporosity greater than 0.05 cc/g in pores of diameter ranging from 600 to 5,000 Angstroms. In some embodiments, a monolithic structural catalyst body of the present invention can comprise an open frontal area greater than or equal to 82%.

In another embodiment, a monolithic structural catalyst body of the present invention comprises a uniform or non-uniform chemical composition comprising 50-99.9% by weight an inorganic oxide composition and at least 0.1% by weight a catalytically active metal functional group; a cell opening of at least 6.0 mm; an erosion weight loss less than or equal to 0.13 g of the monolithic structural catalyst body; and an aggregate lot average areal catalyst weight density ranging from about 200 g/m$^2$ to about 640 g/m$^2$. In some embodiments, the monolithic structural catalyst body of the present invention comprises an erosion weight loss less than or equal to 0.07 g of the monolithic structural catalyst body.

In an embodiment of the present invention, a monolithic structural catalyst body comprises a uniform chemical composition; a catalytically active outer peripheral wall comprising the uniform chemical composition; a plurality of catalytically active inner partition walls comprising the uniform chemical composition, the inner partition walls being arranged inside the outer peripheral wall; and a plurality of flow channels defined by the inner partition walls, the flow channels extending longitudinally through the monolithic structural catalyst body wherein the monolithic structural catalyst body demonstrates a cell opening size, macroporosity, pore diameter, hydraulic diameter, and transverse compressive strength.

Figure 1:
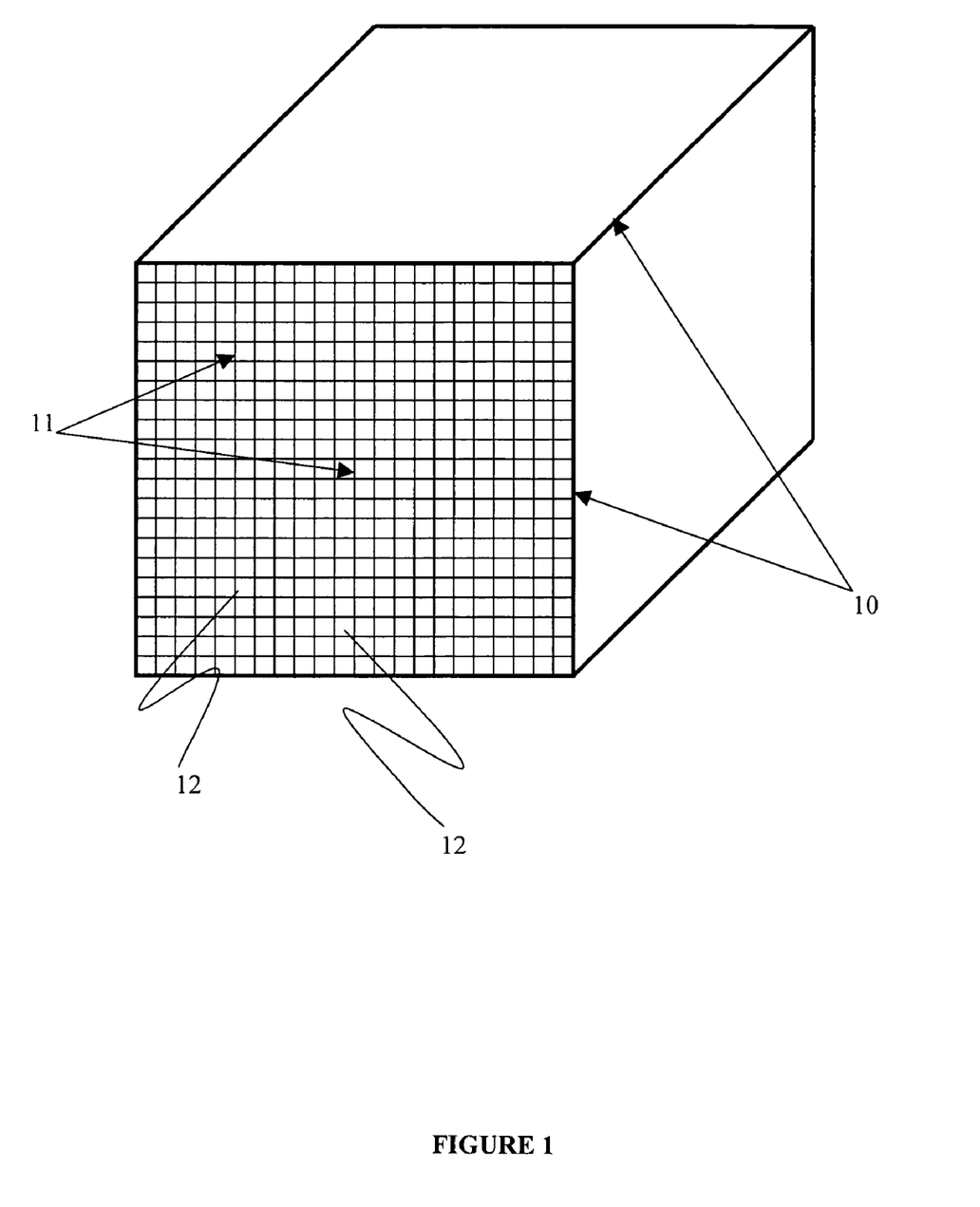
FIG. 1 illustrates a monolithic structural catalyst body according to an embodiment of the present invention.

Referring now to the figures wherein like numerals indicate like elements throughout the several figures, FIG. 1 illustrates monolithic structural catalyst body according to an embodiment of the present invention. The monolithic structural catalyst of FIG. 1 displays a catalytically active outer peripheral wall 10 and a plurality of catalytically active inner partition walls 11. The inner partition walls 11 define a plurality of flow channels or cells 12 which extend longitudinally through the monolithic structural catalyst body.

In one embodiment of the present invention, the monolithic structural catalyst body can comprise a uniform chemical composition comprising 50-99.9% by weight an inorganic oxide composition and at least 0.1% by weight a catalytically active metal functional group. The inorganic oxide composition includes, but is not limited to, titania (TiO$_2$), alumina (Al$_2$O$_3$), zirconia (ZrO$_2$), and/or mixtures thereof. Moreover, the catalytically active metal functional group includes, but is not limited to, vanadium pentoxide (V$_2$O$_5$), tungsten oxide (WO$_3$), molybdenum oxide (MoO$_3$), promoted titanium (Ti) species, and/or mixtures thereof. In further embodiments, the uniform chemical composition can comprise up to 30% by weight other oxides such as silicon dioxide (SiO$_2$), reinforcement agents such as glass fibers, and/or extrusion aids.

In embodiments of the present invention, the plurality of catalytically active inner partition walls and outer peripheral wall comprising the uniform chemical composition can be deposited with additional catalytic material to provide multifunctional catalysis or enhanced surface reactivity, by using one or more additional deposition or treatment steps on the green or fired catalytic structural body. Additional catalytic material can include, but is not limited to, platinum group metals, gold, silver, iridium, cerium, other noble metals and/or mixtures thereof. The depositing of additional catalytic material in or on the inner partition walls can be accomplished by aqueous impregnation, dip coating, washcoating, chemical vapor deposition, spraying of droplets, or other suitable techniques including any surface pre-treatment or post-treatments needed such as treatment with acid solution or thermal post-treatment. Moreover, in embodiments of the present invention, the catalytically active outer peripheral wall comprising the uniform chemical composition can be deposited with additional catalytic material. In such embodiments, the outer peripheral wall can have an average thickness prior to the deposition of at least the average thickness of the inner partition walls comprising the uniform chemical composition prior to deposition.

In another embodiment, the plurality of catalytically active inner partition walls and catalytically active outer peripheral wall comprising the uniform chemical composition can be deposited with a material that is inhibitory to certain chemical reactions, which can favor other chemical reactions, or the material can be inhibitory to the erosion and/or abrasion of the catalyst surface by particulate matter in the fluid stream. The inhibitory material can additionally prevent or reduce the undesired diffusion of gaseous or particulate matter through a surface layer. The inhibitory material may be deposited in any manner consistent with that described for the deposition of additional catalytic material on the plurality of catalytically active inner partition walls and the catalytically active outer peripheral wall.

Figure 2:
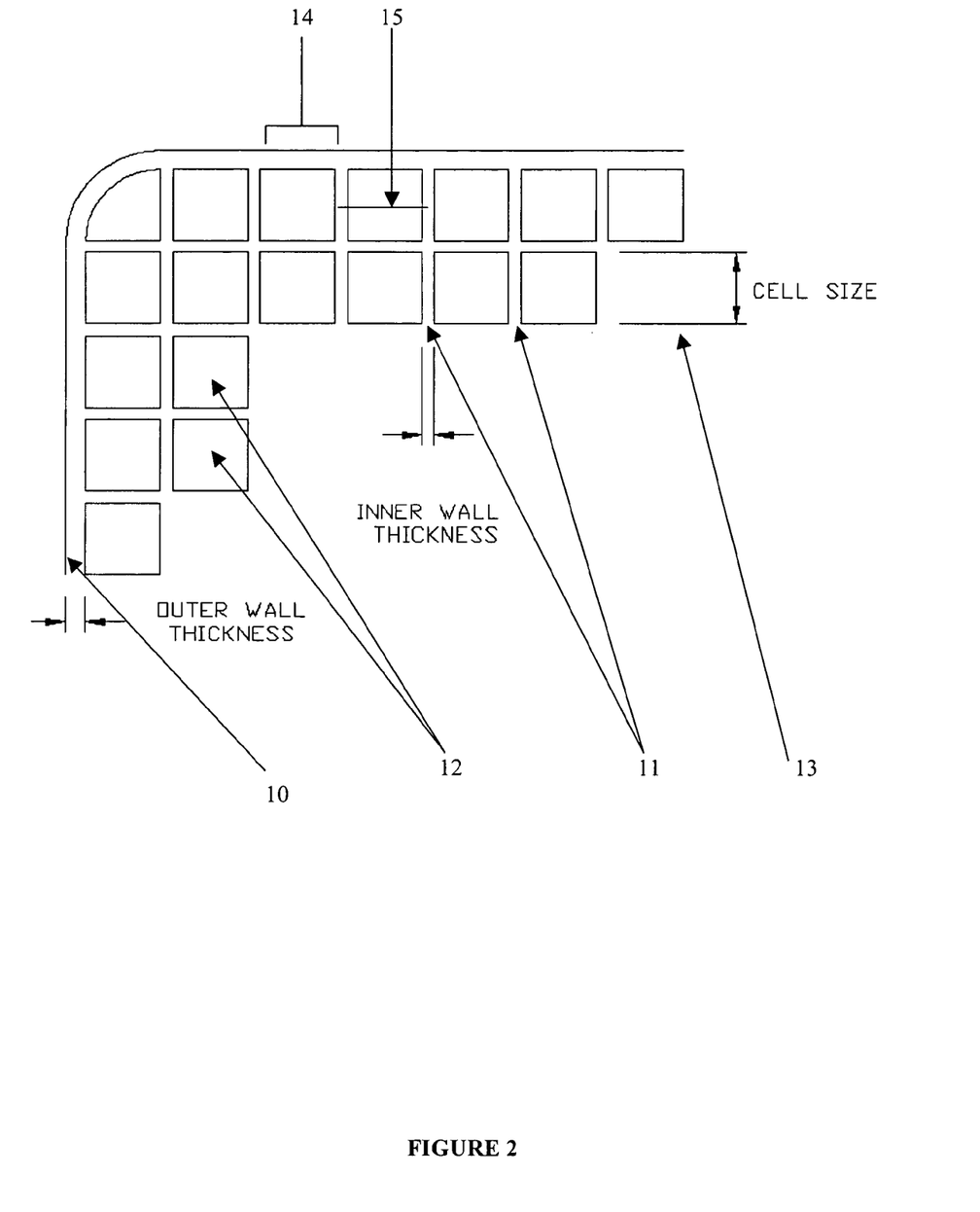
FIG. 2 illustrates a monolithic structural catalyst body according to an embodiment of the present invention.

In an embodiment of the present invention, the monolithic structural catalyst body comprises a plurality of flow channels defined by the inner partition walls, the flow channels extending longitudinally through the honeycomb-like catalyst body. FIG. 2 illustrates flow channels 12 defined by the inner partition walls 11 in a monolithic structural catalyst body according to an embodiment of the present invention. The cell size 13 of a structural catalyst body of the present invention is equal to the cross-sectional area of the flow channel 12 perpendicular to the direction of flow multiplied by four (4) and divided by the value of the outer perimeter of the flow channel. When a flow channel 12 displays a circular cross-sectional geometry, the cell size 13 is equal to the diameter of the circular cross-sectional area of the flow channel 12. When a flow channel 12 demonstrates a square cross-sectional geometry, the cell size 13 is equal to the length of a side of the flow channel 12.

The cell opening size 13 of catalyst bodies of the present invention may be determined with a caliper or micrometer with a resolution of 0.01 mm. A series of cell opening size measurements are taken and averaged to determine the cell opening size for a catalyst body of the present invention. Alternatively, the cell opening size 13 may be calculated from the hydraulic diameter of the catalyst body, and inner partition and outer peripheral wall dimensions of a catalyst body.

Moreover, the inner partition walls 11 and their junctures with the outer peripheral wall serve as boundaries for adjacent flow channels 12. When a portion of the outer peripheral wall 10 serves as a boundary for a flow channel 12, that portion may be referred to as an outer peripheral wall segment 14. Outer peripheral wall segments 14 are important in determining the total wall count for a monolithic catalyst body in embodiments of the present invention. In some embodiments, the axial length in the direction of flow can be 150 mm in length. In some embodiments, the axial length in the direction of flow can be 1300 mm in length. In other embodiments, the axial dimension of a flow channel can vary depending on the preferred application of the catalyst body. The outside of the outer peripheral wall bounds the overall cross-sectional size dimension and overall geometrical cross-sectional shape of the structural catalytic body.

Still referring to FIG. 2, the structural catalyst bodies of the present invention may display a pitch 15. The pitch 15 of the monolithic structural catalyst body is the average distance between the centerline of one inner partition wall and the centerline of any one of the next nearest parallel inner partition walls. In the case of square cross-sectional cells or flow channels, the pitch 15 may be computed as equal to the cell size plus the inner wall thickness, both of which cell size and inner wall thickness may be measured with calipers of adequate resolution at multiple locations and averaged. In the case of other geometries, the pitch 15 of the monolithic structural catalyst body is equal to the average cell opening size of the cells plus the average inner wall thickness which may be computed by appropriate geometrical formulae applied to average measurements of key geometric length features taken at various locations over the entire cross-section of the monolithic structural catalyst body.

In embodiments of the present invention, the cross-sectional profiles of the flow channels can be nominally polygonal such as triangular, square, rectangular, or hexagonal. In other embodiments of the present invention, the cross-sectional profile of the flow channels can be corrugated, round, oval, or combinations with polygonal and curved shapes such as annular sectors. In some embodiments, the cross-sectional profile of the outer peripheral wall of the catalyst body can be square, rectangular, round, oval, circular sectors such as pie slices or quadrants, or any other geometric shape or shapes convenient for a given application.

In an embodiment of the present invention, the monolithic structural catalyst body can have an average cross-sectional size dimension characterized by a hydraulic diameter of at least 145 mm. In other embodiments the catalyst body can have a hydraulic diameter ranging from 152 mm to 154 mm. In further embodiments, the hydraulic diameter can range from 145 mm to 160 mm. The hydraulic diameter of the catalyst body is defined as being equal to the cross-sectional area perpendicular to the direction of flow of the catalyst body multiplied by four and divided by the value of the outer perimeter of the outer peripheral wall. When the monolithic structural catalyst body displays a circular cross-sectional geometry, the hydraulic diameter is equal to the diameter of the circular cross-sectional area. In the case of a square cross-sectional geometry, the hydraulic diameter is equal to the length or width of a side.

In some embodiments of the present invention, the monolithic structural catalyst body can have a macroporosity greater than 0.05 cc/g in pores of diameter ranging from 600 to 5,000 Angstroms. The macroporosities of a catalyst body in an embodiment of the present invention may be determined from analysis of the appropriate pore size ranges of the catalyst body pores size distributions. Pore size distributions and porosities or total pore volumes in embodiments of the present invention may be measured according to ASTM Method UOP578-02 "Automated Pore Volume and Pore Size Distribution of Porous Substances by Mercury Porosimetry," wherein sample preparation for measurements include an oven pre-treatment at 300° C. for one (1) hour as opposed to the vacuum oven pretreatment at 150° C. for eight (8) hours as called for by the ASTM procedure. The remaining steps in the ASTM procedure may be followed without alteration. In another embodiment less than 8% of the total pore volume of the structural catalyst body is in pores of diameter greater than 8,000 Angstroms.

In an embodiment of the present invention, the monolithic structural catalyst body can have a transverse compressive strength greater than 1.5 kg/cm$^2$. The transverse compressive strengths of the monolithic structural catalyst bodies of the present invention may be measured with a compressive testing apparatus such as Tinius Olson 60,000 lb. Super "L" Compression Testing Machine that displays a maximum compression load of 30,000 kg and can be obtained from Tinius Olsen of Willow Grove, Pa. Samples for transverse compressive strength testing may be prepared by cutting a monolithic structural catalyst into sections typically of 150 mm in length, but at least 50 mm in length, wherein each section can serve as an individual test sample.

Ceramic wool of 6 mm thickness may be spread under and over the pressure surface of the sample, and the wrapped sample set in a vinyl bag in the center of the pressure plates. The pressure plates used in the testing may be stainless steel with dimensions of 160 mm×160 mm. Transverse compression strength is quantified with the side surface on the bottom with the compressive load applied in the direction parallel to the cross-section of the honeycomb structure and perpendicular to the partition walls. The compressive load is thus applied in the direction perpendicular to the direction of flow in the flow channels. The compressive load can be applied as delineated in Table 1.

TABLE 1

| Compressive Loads | |
|---|---|
| FULL SCALE LOAD | COMPRESSION SPEED |
| 3,000 kg | 25 kg/s |
| 6,000 kg | 50 kg/s |
| 15,000 kg | 125 kg/s |

The maximum transverse compressive load W (kg) withstood by the samples is registered by the apparatus. The transverse compressive strength is subsequently calculated from the maximum compressive load in kilograms-force (kg$_f$) by dividing the value of the maximum compressive load by the surface area over which the load was applied.

In an embodiment of the present invention where the catalyst body does not lie flat, such as when the catalyst body has an overall circular or oval cross-sectional geometry, a subsection of the catalyst body is cut from the overall sample for testing. The subsection is cut so as to produce a sample with upper and lower flat surfaces. The remainder of the strength testing proceeds in a manner consistent with that previously described.

In some embodiments of the present invention, monolithic structural catalyst bodies can have an erosion weight loss of less than or equal to 0.13 g. The erosion weight loss of the monolithic structural catalyst bodies of the present invention is measured according to ASTM Method G76-04 "Standard Test Method for Conducting Erosion Tests by Solid Particle Impingement Using Gas Jets," conducted by a testing laboratory certified to the ISO 17025 standard "General Requirements for the Competence of Testing and Calibration Laboratories" such as Metcut Research, Inc. of Cincinnati, Ohio, wherein the ASTM procedure is modified according to (a) specification E50TF121, (b) Metcut operation procedure 740.12, (c) a compressed air stream is used to entrain 50 micron aluminum oxide solid particles of tight particle size distribution and greater than 98% purity through a 1.5 mm inner diameter nozzle in order to impinge the solid particles on the surface of the monolithic structural catalyst body sample at a controlled distance of 10 mm for a 30-second interval using a reduced air pressure of 5 psig vs. the normal pressure of 50 psig at an angle of incidence of 20 degrees, (d) the erosion weight loss test values are calibrated at least every fifth test using standard Lexan panels, and (e) the sample surface is selected so as to exclude regions of "edge hardening" such as conventionally used at the inlet region to the monolithic structural catalyst body when used in reduction of nitrogen oxides from coal-fired boilers wherein the flue gas contains erosive coal fly ash particles. The remaining steps in the ASTM procedure may be followed without alteration. Erosion weight loss values of monolithic structural catalysts are reported herein as an average taken from at least two separate tests of a sample.

In another embodiment of the present invention, the monolithic structural catalyst body can have an erosion weight loss of less than or equal to 0.07 g.

In some embodiments, monolithic structural catalyst bodies of the present invention demonstrating an erosion weight loss less than or equal to 0.13 g can comprise a uniform chemical composition. In some embodiments, monolithic structural catalyst bodies of the present invention demonstrating a weight loss less than or equal to 0.13 g can comprise a non-uniform chemical composition. Monolithic structural catalyst bodies comprising a non-uniform chemical composition, for example, can comprise an inorganic oxide substrate wherein catalytic material is impregnated therein or deposited thereon. In some embodiments, monolithic structural catalyst bodies of the present invention demonstrating an erosion weight loss less than or equal to 0.13 g can comprise a uniform chemical composition and additional deposited catalytic material as defined herein.

In some embodiments, the present invention provides a monolithic structural catalyst body having an open frontal area greater than 80%. In some embodiments, the present invention provides a monolithic structural catalyst body having an open frontal area greater than or equal to 82%. In another embodiment, the present invention provides a monolithic structural catalyst body having an open frontal area greater than 80% wherein the structural catalyst body has a cell density of at least 2.05 cells/cm$^2$. The open frontal area of the monolithic structural catalyst body is equal to the total area of all of the cells across the entire cross-section of the monolithic structural catalyst body divided by the cross-sectional area of the monolithic structural catalyst body. In the case of square cells or flow channels and a square overall cross-sectional geometry for the monolithic structural catalyst body, the open frontal area may be computed as equal to the cell size multiplied by the cell size multiplied by the total number of cells across the cross-section of the monolithic structural catalyst body divided the total cross-sectional area of the monolithic structural catalyst body. In this case of square cells or flow channels and square overall cross-sectional geometry, the latter total cross-sectional area of the monolithic structural catalyst body is equal to the hydraulic diameter of the structural catalyst body multiplied by the hydraulic diameter of the structural catalyst body.

Moreover, the cell density is the number of cells per unit cross-sectional area of monolithic structural catalyst body. The cell density may be calculated as the number of cells over the entire cross-section of the monolithic structural catalyst body divided by the cross-sectional area of the monolithic structural catalyst body.

The high open frontal area structure and composition of the monolithic structural catalyst body of the present invention can provide several advantages not present in prior monolithic catalyst bodies. The catalyst bodies of the present invention demonstrate an increased geometric surface area to bulk volume ratio. The increase in this ratio corresponds to lower areal catalyst weight density for catalyst bodies of the present invention. As a result catalyst bodies of the present invention achieve efficient catalytic activity with less catalytic material per unit geometric surface area. Such an arrangement can save catalyst body weight and catalyst production costs.

Advantages in catalyst body weight reduction may be realized in reducing the amount of weight that must be supported. The reduction in weight may reduce the amount and expense of the support structure for the catalysts including the amount of steel required for catalyst support assemblies in certain applications as well as the amount of space. Reducing catalyst body weight may advantageously decrease the size and weight of the ductwork support framework and foundation materials required for stationary applications, especially electric power generation applications, at a commercial or industrial installation. Moreover, in retrofit applications where the high open frontal area catalyst structure of the present invention is displacing a prior catalyst body, the weight reduction can additionally result in reduced mechanical stress on the existing support structure.

A lower areal catalyst weight density is additionally advantageous in reducing the oxidation of sulfur dioxide by the catalyst bodies of the present invention. The areal catalyst weight density reduces the amount of catalytic material per unit geometric surface area. The kinetics associated with the selective catalytic reduction of nitrogen oxides are fast enough so that catalytic material located on the surface of the wall to a depth of about 20% below the surface of the wall handles mostly all of the selective catalytic reduction. As a result, selective catalytic reduction does not utilize catalytic material deep within the walls of the catalyst body.

The oxidation of sulfur dioxide, however, is kinetically much slower than that of nitrogen oxides. As a result, the sulfur dioxide content of a fluid diffuses fully into the pores of the catalyst body where it can achieve oxidation at a slower pace. The lower amount of catalytic material per unit geometric surface area of the present invention reduces the amount of sulfur dioxide oxidation per unit geometric surface area within the catalyst body. As a result, catalyst bodies of the present invention can achieve an efficient selective catalytic reduction of nitrogen oxides with a given required amount of geometric surface for conducting reaction in the surface region while minimizing undesired sulfur dioxide oxidation due to the lower catalyst mass per unit geometric surface area.

The cell sizes of catalyst bodies of the present invention are additionally advantageous in that they comprise sizes that are resistant to plugging by particulate matter contained in the fluid passing through the catalyst body. The cell sizes of the present invention are sufficiently large wherein a single particle is unlikely to have the requisite dimensions to plug a cell and wherein smaller particles will have trouble aggregating to form a plug. Moreover, the present cell size can produce a catalyst body with a greater open frontal area, the open frontal area being that portion of the cross-section available for flow on a cross-sectional surface perpendicular to the direction of flow. An increased frontal area can result in more efficient fluid flow characteristics within the catalyst body, which can decrease the pressure drop sustained by fluids passing through the catalyst body. The reduction in pressure drop is advantageous in many applications. For example, in electrical power generation, a reduction in pressure drop decreases parasitic power losses.

In addition to the cell opening sizes, the pore size distribution exhibited by catalyst bodies of the present invention are resistant to clogging by fine particulate matter. The pores in the walls of the catalyst bodies of the present invention are sufficiently small to preclude extensive clogging by particulate matter. Pore diameters of 8,000 Angstroms or greater, however, have an increased potential for clogging by particulate matter contained in the fluid flowing through the catalyst body. Fine particles that precipitate pore clogging often have dimensions of 8,000 Angstroms or greater. As a result, pores with diameters in excess of 8,000 Angstroms demonstrate the ability to accommodate the size of these fine particles leading to pore clogging. The smaller pore diameters displayed by the catalyst bodies of the present invention can facilitate the rejection of many particles allowing the pores to remain relatively clear thereby enhancing catalytic activity over the life of the catalyst body.

The advantages offered by the catalyst bodies of the present invention make them particularly useful for applications wherein coal is combusted to produce a coal-fired combustion flue-gas. Catalyst bodies of the present invention can effectively deal with the sulfur dioxide content of a coal-fired combustion flue-gas as well as the high ash content. Catalyst bodies of the present invention may additionally find applicability in other environments comprising high particulate matter.

A monolithic structural catalyst body of the present invention may be produced by mixing up to 50-99.9% by weight an inorganic oxide composition, or a precursor which yields an inorganic oxide composition and at least 0.1% by weight a catalytically active metal functional group, or a precursor which yields a catalytically active metal functional group. The inorganic oxide composition includes, but is not limited to, titania ($TiO_2$), alumina ($Al_2O_3$), zirconia ($ZrO_2$), and/or mixtures thereof. Moreover, the catalytic metal functional group includes, but is not limited to, vanadium pentoxide ($V_2O_5$), tungsten oxide ($WO_3$), molybdenum oxide ($MoO_3$), promoted (Ti) titanium species, and/or mixtures thereof. The resulting catalytic mixture can be kneaded into a clay-like substance and subsequently extruded from an extrusion molding machine to form a honeycomb-like monolithic catalyst structure comprising the outer partition wall, inner partition walls and longitudinal flow channels.

In some embodiments, when the monolithic structural catalyst body is extruded, the extrusion formulation can comprise any number of peptizing agents, binding agents, extrusion aids, lubricants, plasticizers, reinforcement agents, and the like to assist in the extrusion process and/or generate the desired structural and pore properties for an intended application. Examples of materials that may be included in an extrusion formula include, but are not limited to, glass fibers or strands, silicon carbide fibers, inorganic acids (e.g. phosphoric acid, nitric acid, etc.) organic acids (e.g. acetic acid, citric acid, formic acid, etc.), salts of organic acids (e.g. ammonium formate, ammonium acetate, ammonium citrate, etc.) cellulose compounds, starches, polyethylene oxide, stearic alcohols, alcohols, graphite, stearic acid, amines, oils, fats, and polymers. The extruded product may subsequently be dried or thermally treated. Moreover, in some embodiments, the extruded product may be subsequently deposited as explained herein with additional catalyst material such as a platinum group metal or other noble metal.

A monolithic structural catalyst body of the present invention may be produced by methods generally used in the art, including extruding, molding and the like. The starting material for extruding may be generally produced by admixing the chemical compositions utilized in the catalyst body. As described herein, the chemical compositions may comprise inorganic oxides, including inorganic oxides or other metals with catalytic functionality. To the extent utilized, fillers, binders, extrusion aids, lubricants, reinforcing agents, and the like, may also be admixed with the chemical compositions. The resulting catalytic mixture can be mixed with water, kneaded into a paste that is form-stable up to the yield point of the material, and subsequently extruded from an extrusion molding machine to form a form-stable honeycomb-like monolithic catalyst structure comprising the outer partition wall, inner partition walls and longitudinal flow channels. The extrusion system may include extruder machines, a filter or screen, and an extrusion die. The filter or screen may be utilized to facilitate passage of the mixture through the die, for example to reduce clogging of the die, without removing filler, binders, and reinforcement aids that provide advantageous product properties. The extruded product may subsequently be dried or thermally treated.

It is generally desirable, when extruding embodiments of the present invention to use sufficient energy to achieve intimate mixing of the compositional ingredients while minimizing additional energy that may have an adverse impact on particle packing characteristics that provide advantageous product properties.

Additional energy is utilized in the mixing equipment to increase form-stability, and in the extrusion system to move the extrusion mixture through the extruder machines, filter or screen and die. As set forth above, lubricants and extrusion aids may be utilized in the starting composition for the catalyst body to minimize this additional energy. Other means of reducing additional energy known in the art, include maximizing mixer and extruder efficiency and minimizing wall friction in the screen and die.

In another aspect, the present invention provides methods for catalyzing reactions in a fluid comprising contacting the fluid with a catalyst body of the present invention. An embodiment of a method of the present invention for reducing the nitrogen oxide content of a fluid comprises contacting the fluid with, for example by flowing the fluid through, a monolithic structural catalyst body of the present invention comprising a chemical composition suitable for the selective catalytic reduction of nitrogen oxides.

In an embodiment of the present invention, a method for reducing the nitrogen dioxide content of a fluid comprises flowing the fluid through a monolithic structural catalyst body comprising a uniform chemical composition comprising 50-99.9% by weight an inorganic oxide composition and at least 0.1% by weight a catalytically active metal functional group; a cell opening of at least 5.5 mm; and an aggregate lot average areal catalyst weight density ranging from about 200 $g/m^2$ to about 640 $g/m^2$ wherein less than 8% of the total pore volume is in pores having a diameter greater than 8,000 Angstroms.

In another embodiment, a method for reducing the nitrogen dioxide content of a fluid comprises flowing the fluid through a monolithic structural catalyst body comprising a uniform chemical composition comprising 50-99.9% by weight an inorganic oxide composition and at least 0.1% by weight a catalytically active metal functional group; a cell opening of at least 5.5 mm; and an areal catalyst weight density ranging from about 200 g/m² to about 625 g/m² wherein less than 8% of the total pore volume is in pores having a diameter greater than 8,000 Angstroms In another embodiment, a method for reducing the nitrogen dioxide content of a fluid comprises flowing the fluid through a monolithic structural catalyst body comprising a uniform chemical composition comprising 50-99.9% by weight an inorganic oxide composition and at least 0.1% by weight a catalytically active metal functional group; a cell opening of at least 5.5 mm; an open frontal area greater than 80%; and an areal catalyst weight density ranging from about 200 g/m² to about 800 g/m² wherein less than 8% of the total pore volume is in pores having a diameter greater than 8,000 Angstroms. In some embodiments, the monolithic structural catalyst body can comprise an open frontal area of greater than or equal to 82%.

In a further aspect, a method for reducing the nitrogen dioxide content of a fluid can comprise flowing a fluid through a monolithic structural catalyst body comprising additional deposited catalytic material. In an embodiment, a method of reducing the nitrogen dioxide content of a fluid comprises flowing a fluid through a monolithic structural catalyst body comprising a uniform chemical composition comprising 50-99.9% by weight an inorganic oxide composition and at least 0.1% by weight a catalytically active metal functional group; additional deposited catalytic material; a cell opening of at least 5.5 mm; and an aggregate lot average areal catalyst weight density ranging from about 200 g/m² to about 640 g/m² wherein less than 8% of the total pore volume is in pores having a diameter greater than 8,000 Angstroms.

In another embodiment a method for reducing the nitrogen dioxide content of a fluid comprises flowing the fluid through a monolithic structural catalyst body comprising a uniform chemical composition comprising 50-99.9% by weight an inorganic oxide composition and at least 0.1% by weight a catalytically active metal functional group; additional deposited catalytic material; a cell opening of at least 5.5 mm; and an areal catalyst weight density ranging from about 200 g/m² to about 625 g/m² wherein less than 8% of the total pore volume is in pores having a diameter greater than 8,000 Angstroms. In some embodiments, the monolithic structural catalyst body can comprise a cell opening of 6.0 mm.

In another embodiment, a method for reducing the nitrogen dioxide content of a fluid comprises flowing the fluid through a monolithic structural catalyst body comprising a uniform chemical composition comprising 50-99.9% by weight an inorganic oxide composition and at least 0.1% by weight a catalytically active metal functional group; additional deposited catalytic material; a cell opening of at least 5.5 mm; an open frontal area greater than 80% wherein the monolithic structural catalyst body has a cell density of at least 2.05 cells/cm²; and an areal catalyst weight density ranging from about 200 g/m² to about 800 g/m² wherein less than 8% of the total pore volume is in pores having a diameter greater than 8,000 Angstroms. In some embodiment, the monolithic structural catalyst body can comprise an open frontal area greater than or equal to 82%.

In another embodiment, a method for reducing the nitrogen dioxide content of a fluid comprises flowing the fluid through a monolithic structural catalyst body comprising a uniform chemical composition comprising 50-99.9% by weight an inorganic oxide composition and at least 0.1% by weight a catalytically active metal functional group; a cell opening of at least 6.0 mm; an open frontal area greater than 80%; and an areal catalyst weight density ranging from about 200 g/m² to about 800 g/m² wherein less than 8% of the total pore volume is in pores having a diameter greater than 8,000 Angstroms. In some embodiment, the monolithic structural catalyst body can comprise an open frontal area greater than or equal to 82%.

In another embodiment, a method for reducing the nitrogen dioxide content of a fluid comprises flowing the fluid through a monolithic structural catalyst body comprising a uniform or non-uniform chemical composition comprising 50-99.9% by weight an inorganic oxide composition and at least 0.1% by weight a catalytically active metal functional group; a cell opening size of at least 6.0 mm; an erosion weight loss less than or equal to 0.13 g; and an aggregate lot average areal catalyst weight density ranging from about 200 g/m² to about 640 g/m².

In some embodiments, the cell opening size of the monolithic structural catalyst body in any of the preceding methods can be at least 6.0 mm.

In some embodiments of a method of reducing the nitrogen oxide content of a fluid, the fluid can comprise combustion-flue gases or any other gas containing nitrogen oxides. In another embodiment, the fluid can comprise a coal-fired combustion flue-gas. In a further embodiment, the fluid can comprise any gas with high particulate matter content. Moreover, in another embodiment, the temperature of the gas flowing through the honeycomb-like monolithic structural catalyst body can range from about 150° C. to about 600° C.

Similar techniques may be utilized for catalyzing reactions in other fluids.

The embodiments described above in addition to other embodiments can be further understood with reference to the following examples. The tests used and reported on in the following Examples were as described above.

EXAMPLE 1

Prior Art

Example 1 describes a prior art monolithic structural catalyst body. The monolithic structural catalyst body of Example 1 was produced in full-scale manufacturing facilities by mixing of ingredients, extrusion, rough cutting to desired length, drying, calcination, and finish trim cutting to exact final length. The compositional parameters and physical properties of the catalytic body are summarized in Table 2. The catalytic body displayed a catalyst composition comprising an inorganic oxide content of 82.5% titania ($TiO_2$), 9.3% catalytically active metals composition comprising vanadium pentoxide ($V_2O_5$) and tungsten trioxide ($WO_3$), and 8.2% other components comprising $SiO_2$, $CaO$, $Al_2O_3$, $Fe_2O_3$, $SO_4$, and minor species. A catalyst aggregate lot expressed as a total bulk volume equal to 675 m³ of the monolithic structural catalyst body was prepared in the full-scale manufacturing equipment.

The flow channels enclosed by the inner partition walls and outer peripheral wall were nominally square in cross-sectional profile with a cell size of 6.4 mm. The pitch of monolithic catalyst body was 7.1 mm. The outer perimeter of the outer periphery was nominally square in overall cross-sectional profile with a hydraulic diameter of 150.6 mm. The cell density of the monolithic structural catalyst body was 1.94 cells/cm², and the open frontal area was calculated to have a value of 0.79. The structural catalyst body had a lot average areal weight density, or mass per unit geometric surface area, of 684 g/m².

The transverse compressive strength of the catalyst body of Example 1 was measured according to the method previously described. The catalyst body displayed a transverse compressive strength of 9.0 kg/cm². The total pore volume and macroporosity of catalyst body were determined in a manner consistent with the ASTM mercury intrusion porosimetry procedure previously described for calculating these parameters. The porosity was measured to be 0.340 cc/g. The macroporosity in pores of diameter greater than or equal to 8,000 Angstroms was measured to be 0.0215 cc/g, which was calculated to be 6.3% of the total pore volume. The macroporosity in pores of diameter from 600 to 5,000 Angstroms was measured to be 0.0688 cc/g, which was calculated to be 20.2% of the total pore volume.

The monolithic structural catalyst body of Example 1 was subsequently tested for the selective catalytic reduction of nitrogen oxides in a gas. Performance testing of the catalytic body for the selective reduction of nitrogen oxides was conducted in accordance with the VGB Guideline VGB-R 302He ("Guideline for the Testing of DENOX Catalysts"), $2^{nd}$ revised edition (1998). The catalytic performance was measured in a natural gas fired pilot reactor at a temperature of 378° C. in a gas stream comprising 3.9% oxygen on a dry basis, 17.3% water vapor, 8.1% carbon dioxide, 2100 ppmv sulfur dioxide, 260 ppmv nitrogen monoxide, 243 ppmv ammonia, and balance $N_2$ plus minor flue gas species, following the VGB Guideline using two full-length samples each having a length of 1335 mm. The molar ratio of ammonia to nitrogen monoxide was 0.935 at the catalyst inlet. The catalytic performance test was conducted at an area velocity of 10.8 normal cubic meters of gas flow per hour per square meter of geometric surface area.

The monolithic structural catalyst body of Example 1 demonstrated a 92.8% reduction in nitrogen oxide of the gas stream passed through the catalyst body. The observed ammonia slip at the reactor outlet was measured to be 1.9 ppmv. The calculated catalytic activity for the catalyst body was determined to be 28.5 normal cubic meters per hour per square meter at a molar ratio of ammonia to nitrogen monoxide of 0.935 as calculated according to the VGB Guideline. These results are summarized in Table 2.

TABLE 2

| | EXAMPLE 1 |
|---|---|
| Titanium Dioxide ($TiO_2$) Content, Wt. % | 82.5 |
| Tungsten Trioxide ($WO_3$) + Vanadium Pentoxide ($V_2O_5$) Content, Wt. % | 9.3 |
| Other Components ($SiO_2$, CaO, $Al_2O_3$, $Fe_2O_3$, $SO_4$, and other minor species), Wt. % | 8.2 |
| Nominal Cell Cross-Sectional Shape | Square |
| Cell Size, mm | 6.4 |
| Pitch, mm | 7.1 |
| Nominal Overall Cross-Sectional Shape | Square |
| Hydraulic Diameter of Structural Catalyst Body (mm) | 150.6 |
| Cell Density, cells/$cm^2$ | 1.94 |
| Open Frontal Area, fractional | 0.79 |
| Aggregate Lot Quantity (expressed as bulk volume), $m^3$ | 675 |
| Aggregate Lot Average Areal Weight Density (mass per unit geometric area), g/$m^2$ | 684 |
| Transverse Compression Strength (kg/$cm^2$) | 9.0 |
| Total Pore Volume, cc/g | 0.340 |
| Macroporosity above 8,000 Angstroms pore diameter, , cc/g | 0.0215 |
| Macroporosity above 8,000 Angstroms, % of Total Pore Volume | 6.3% |
| Macroporosity in 600–5,000 Angstroms pore diameter range, cc/g | 0.0688 |
| Macroporosity in 600–5,000 Angstroms range, % of Total Pore Volume | 20.2% |
| Area Velocity in Performance Test, $Nm^3$/(hr-$m^2$) | 10.8 |
| $NO_x$ Reduction Observed in Test, % of Inlet $NO_x$ | 92.8 |
| Ammonia Slip at Outlet, ppmv | 1.9 |
| Catalytic Activity (K) at 0.935 molar ratio of ammonia to nitrogen monoxide, $Nm^3$/(hr-$m^2$) | 28.5 |

EXAMPLE 2

Prior Art

Example 2 describes another prior art honeycomb-like monolithic structural catalyst body. The monolithic structural catalyst body of Example 2 was produced in full-scale manufacturing facilities by a commercial supplier and provided commercially to an electric power generation facility for use in the selective catalytic reduction of nitrogen oxides. Samples were taken from the electric power generation facility including fresh samples that had not been in SCR service as well as samples after some indeterminate period of use in SCR service. Both sets of fresh and used catalysts exhibited identical physical and chemical properties, and had a uniform chemical composition throughout the monolithic structural catalyst body samples, indicating that the catalyst lot had been prepared by an extrusion technique.

The compositional parameters and physical properties of the catalytic body are summarized in Table 3. The catalytic body displayed a catalyst composition comprising an inorganic oxide content of 76.5% titania ($TiO_2$), 9.0% catalytically active metals composition comprising vanadium pentoxide ($V_2O_5$) and tungsten trioxide ($WO_3$), and 14.5% other components comprising $SiO_2$, CaO, $Al_2O_3$, $Fe_2O_3$, $SO_4$, and minor species.

The flow channels enclosed by the inner partition walls and outer peripheral wall were nominally square in cross-sectional profile having a cell size of 5.8 mm. The pitch of monolithic catalyst body was 6.8 mm. The outer perimeter of the outer periphery was nominally square in overall cross-sectional profile with a hydraulic diameter of 151.1 mm. The cell density of the monolithic structural catalyst body was 2.12 cells/$cm^2$, and the open frontal area was calculated to have a value of 0.72. The monolithic structural catalyst body samples of Example 2 had an average mass per unit geometric surface area of 1,280 g/$m^2$. These results are summarized in Table 3.

TABLE 3

| | EXAMPLE 2 |
|---|---|
| Titanium Dioxide ($TiO_2$) Content, Wt. % | 76.5 |
| Tungsten Trioxide ($WO_3$) + Vanadium Pentoxide ($V_2O_5$) Content, Wt. % | 9.0 |
| Other Components ($SiO_2$, CaO, $Al_2O_3$, $Fe_2O_3$, $SO_4$, and other minor species), Wt. % | 14.5 |
| Nominal Cell Cross-Sectional Shape | Square |
| Cell Size, mm | 5.8 |
| Pitch, mm | 6.8 |
| Nominal Overall Cross-Sectional Shape | Square |
| Hydraulic Diameter of Structural Catalyst Body (mm) | 151.1 |
| Cell Density, cells/$cm^2$ | 2.12 |
| Open Frontal Area, fractional | 0.72 |
| Areal Weight Density (mass per unit geometric area), g/$m^2$ | 1,280 |

EXAMPLE 3

A honeycomb-like monolithic structural catalyst body of the present invention was prepared in full-scale manufacturing facilities by mixing of ingredients, extrusion according to the method described herein for producing a structural catalyst body of the present invention wherein die clogging was minimized by the use of a screen, followed by rough cutting, drying, calcination, and final trim cutting to exact length. The compositional parameters and physical properties of the catalytic body are summarized in Table 4. The catalytic body displayed a catalyst composition comprising an inorganic oxide content of 82.8% titania ($TiO_2$), 9.5% catalytically active metals composition comprising vanadium pentoxide ($V_2O_5$) and tungsten trioxide ($WO_3$), and 7.7% other components comprising $SiO_2$, CaO, $Al_2O_3$, $Fe_2O_3$, $SO_4$, and minor species. A catalyst aggregate lot expressed as a total bulk volume equal to 6 $m^3$ of the monolithic structural catalyst body was prepared in the full-scale manufacturing equipment.

The flow channels enclosed by the inner partition walls and outer peripheral wall were nominally square in cross-sectional profile having a cell size of 6.3 mm. The pitch of monolithic catalyst body was 6.9 mm. The outer perimeter of the outer periphery was nominally square in overall cross-sectional profile with a hydraulic diameter of 152.4 mm. The cell density of the monolithic structural catalyst body was 2.08 cells/$cm^2$, and the open frontal area was calculated to have a value of 0.82. The structural catalyst body had a lot average areal weight density, or mass per unit geometric surface area, of 606 g/$m^2$.

The transverse compressive strength of the catalyst body of Example 3 was measured according to the method previously discussed. The catalyst body displayed a transverse compressive strength of 6.0 kg/$cm^2$. The total pore volume and macroporosity of samples of the monolithic structural catalyst body were determined in a manner consistent with the ASTM mercury intrusion porosimetry procedure previously described for calculating these parameters. The porosity was measured to be 0.329 cc/g. The macroporosity in pores of diameter greater than or equal to 8,000 Angstroms was measured to be 0.0178 $cm^3$/g, which was calculated to be 5.4% of the total pore volume. The macroporosity in pores of diameter from 600 to 5,000 Angstroms was measured to be 0.0567 cc/g, which was calculated to be 17.3% of the total pore volume. The erosion weight loss of the catalyst body of Example 3 was measured according to the method previously discussed. The catalyst body displayed an average erosion weight loss of 0.11 g. These results are summarized in Table 4.

TABLE 4

| | EXAMPLE 3 |
|---|---|
| Titanium Dioxide ($TiO_2$) Content, Wt. % | 82.8 |
| Tungsten Trioxide ($WO_3$) + Vanadium Pentoxide ($V_2O_5$) Content, Wt. % | 9.5 |
| Other Components ($SiO_2$, CaO, $Al_2O_3$, $Fe_2O_3$, $SO_4$, and other minor species), Wt. % | 7.7 |
| Nominal Cell Cross-Sectional Shape | Square |
| Cell Size, mm | 6.3 |
| Pitch, mm | 6.9 |
| Nominal Overall Cross-Sectional Shape | Square |
| Hydraulic Diameter of Structural Catalyst Body (mm) | 152.4 |
| Cell Density, cells/$cm^2$ | 2.08 |
| Open Frontal Area, fractional | 0.82 |
| Aggregate Lot Quantity (expressed as bulk volume), $m^3$ | 6 |
| Aggregate Lot Average Areal Weight Density (mass per unit geometric area), g/$m^2$ | 606 |
| Transverse Compression Strength (kg/$cm^2$) | 6.0 |
| Total Pore Volume, cc/g | 0.329 |
| Macroporosity above 8,000 Angstroms pore diameter, , cc/g | 0.0178 |
| Macroporosity above 8,000 Angstroms, % of Total Pore Volume | 5.4% |
| Macroporosity in 600–5,000 Angstroms pore diameter range, cc/g | 0.0567 |
| Macroporosity in 600–5,000 Angstroms range, % of Total Pore Volume | 17.3% |
| Erosion Weight Loss, g | 0.11 |

Comparison of Example 3 with Examples 1 and 2 demonstrates advantages of monolithic structural catalysts of the present invention. The catalyst bodies in Examples 1, 2, and 3 display similar catalyst compositions which are effective for the selective catalytic reduction of nitrogen oxides as illustrated by Example 1.

The monolithic structural catalyst body of Example 3, however, displays an aggregate lot average areal weight density of 606 g/$m^2$ and a macroporosity in pores of diameter greater than or equal to 8,000 Angstroms of 0.0178 cc/g. A macroporosity of 0.0178 cc/g translates into 5.4% of the total pore volume being in pores greater than or equal to 8,000 Angstroms. The combination of a low aggregate lot average areal weight density and a macroporosity of 0.0178 cc/g in pores with diameter greater than 8,000 Angstroms can allow the monolithic structural catalyst body of Example 3 to have a reduced weight, a reduced amount of sulfur dioxide oxidation, and an increased resistance to pore clogging by particulate matter. Examples 1 and 2 have higher aggregate lot average areal weight densities of 681 g/$m^2$ and 1280 g/$m^2$ respectively.

Examples 4 and 5 demonstrate reduced sulfur dioxide oxidation by a monolithic structural catalyst body of the present invention.

EXAMPLE 4

Prior Art

Example 4 describes a prior art monolithic structural catalyst body. The monolithic structural catalyst body of Example 4 was produced in full-scale manufacturing facilities for use in the selective catalytic reduction of nitrogen oxides by a commercial supplier. The monolithic structural catalyst body had not been in SCR service. The structural catalyst body exhibited uniform physical and chemical properties, uniform chemical composition, and was prepared by an extrusion technique.

The compositional parameters and physical properties of the catalytic body are summarized in Table 5. The catalytic body displayed a catalyst composition comprising an inorganic oxide content of 81.5% titania ($TiO_2$), 9.5% catalytically active metals composition comprising vanadium pentoxide ($V_2O_5$) and tungsten trioxide ($WO_3$), and 9.0% other components comprising $SiO_2$, CaO, $Al_2O_3$, $Fe_2O_3$, $SO_4$, and minor species.

The flow channels enclosed by the inner partition walls and outer peripheral wall were nominally square in cross-sectional profile with a cell size of 6.3 mm. The pitch of monolithic catalyst body was 7.3 mm. The outer perimeter of the outer periphery was nominally square in overall cross-sectional profile with a hydraulic diameter of 149.1 mm. The cell density of the monolithic structural catalyst body was 1.80 cells/cm$^2$, and the open frontal area was calculated to have a value of 0.71. The structural catalyst body had a lot average areal weight density, or mass per unit geometric surface area, of 1240 g/m$^2$. The erosion weight loss of the catalyst body of Example 4 was measured according to the method previously discussed. The catalyst body displayed an average erosion weight loss of 0.26 g.

The monolithic structural catalyst body of Example 4 was subsequently tested for the selective catalytic reduction of nitrogen oxides in a gas. Performance testing of the catalytic body for the selective reduction of nitrogen oxides was conducted in accordance with the VGB Guideline VGB-R 302He ("Guideline for the Testing of DENOX Catalysts"), 2$^{nd}$ revised edition (1998). The catalytic performance was measured in a natural gas fired pilot reactor at a temperature of 377° C. in a gas stream comprising 3.5% oxygen on a dry basis, 17.9% water vapor, 8.3% carbon dioxide, 1570 ppmv sulfur dioxide, 407 ppmv nitrogen monoxide, 324 ppmv ammonia, and balance N$_2$ plus minor flue gas species, following the VGB Guideline using two full-length samples having lengths of 720 mm and 722 mm. A bulk catalyst volume of 32.0 liters was tested. The molar ratio of ammonia to nitrogen monoxide was 0.797 at the catalyst inlet. The catalytic performance test was conducted at an area velocity of 10.8 normal cubic meters of gas flow per hour per square meter of geometric surface area and a gas flowrate of 156 normal cubic meters per hour.

The monolithic structural catalyst body of Example 4 demonstrated a 79.4% reduction in nitrogen oxide of the gas stream passed through the catalyst body. The observed ammonia slip at the reactor outlet was measured to be 1.1 ppmv. These results are summarized in Table 5.

The monolithic structural catalyst body of Example 4 was subsequently tested for the catalytic oxidation of sulfur dioxide to sulfur trioxide in a gas. Performance testing of the catalytic body for the catalytic oxidation of sulfur dioxide to sulfur trioxide was conducted in accordance with the VGB Guideline VGB-R 302He ("Guideline for the Testing of DENOX Catalysts"), 2$^{nd}$ revised edition (1998). The catalytic performance was measured in a natural gas fired pilot reactor at a temperature of 377° C. in a gas stream comprising 3.5% oxygen on a dry basis, 17.9% water vapor, 8.3% carbon dioxide, 405 ppmv nitrogen monoxide, 1570 ppmv sulfur trioxide, and balance N$_2$ plus minor flue gas species, following the VGB Guideline using the same two full-length samples as used in the selective reduction of nitrogen oxides test, the samples having lengths of 720 mm and 722 mm. A bulk catalyst volume of 32.0 liters was tested. The catalytic performance test was conducted at an area velocity of 6.1 normal cubic meters of gas flow per hour per square meter of geometric surface area, and a gas flowrate of 87.9 normal cubic meters per hour. The monolithic structural catalyst body of Example 4 demonstrated a 1.9% conversion of sulfur dioxide in the gas stream to sulfur trioxide while displaying a pressure drop for gas flow through the catalyst of 0.48 inches of water. These results are summarized in Table 5.

TABLE 5

| | EXAMPLE 4 |
|---|---|
| Titanium Dioxide (TiO$_2$) Content, Wt. % | 81.5 |
| Tungsten Trioxide (WO$_3$) + Vanadium Pentoxide (V$_2$O$_5$) Content, Wt. % | 9.5 |
| Other Components (SiO$_2$, CaO, Al$_2$O$_3$, Fe$_2$O$_3$, SO$_4$, and other minor species), Wt. % | 9.0 |
| Nominal Cell Cross-Sectional Shape | Square |
| Cell Size, mm | 6.3 |
| Pitch, mm | 7.3 |
| Nominal Overall Cross-Sectional Shape | Square |
| Hydraulic Diameter of Structural Catalyst Body (mm) | 149.1 |
| Cell Density, cells/cm$^2$ | 1.80 |
| Open Frontal Area, fractional | 0.71 |
| Aggregate Lot Average Areal Weight Density (mass per unit geometric area), g/m$^2$ | 1240 |
| Erosion Weight Loss, g | 0.26 |
| Test Summary - Selective Catalytic Reduction of Nitrogen Oxides: | |
| Area Velocity in Performance Test, Nm$^3$/(hr-m$^2$) | 10.8 |
| Bulk Catalyst Volume of Samples Tested (liters) | 32.0 |
| Gas Flow Rate (Nm$^3$/hr) | 156 |
| NO$_x$ Reduction Observed in Test, % of Inlet NO$_x$ | 79.4 |
| Ammonia Slip at Outlet, ppmv | 1.1 |
| Test Summary - Catalytic Oxidation of Sulfur Dioxide to Sulfur Trioxide: | |
| Area Velocity in Performance Test, Nm$^3$/(hr-m$^2$) | 6.1 |
| Bulk Catalyst Volume of Samples Tested (liters) | 32.0 |
| Gas Flowrate (Nm$^3$/hr) | 87.9 |
| Pressure Drop Through Catalyst (inches of water) | 0.48 |
| Catalytic Conversion of Sulfur Dioxide in Gas (%) | 1.9 |

EXAMPLE 5

A honeycomb-like monolithic structural catalyst body of the present invention was prepared in full-scale manufacturing facilities by mixing of ingredients, extrusion according to the method described herein for producing a structural catalyst body of the present invention wherein die clogging was minimized by the use of a screen, followed by rough cutting, drying, calcination, and final trim cutting to exact length. The compositional parameters and physical properties of the catalytic body are summarized in Table 6. The catalytic body displayed a catalyst composition comprising an inorganic oxide content of 81.9% titania (TiO$_2$), 9.0% catalytically active metals composition comprising vanadium pentoxide (V$_2$O$_5$) and tungsten trioxide (WO$_3$), and 9.1% other components comprising SiO$_2$, CaO, Al$_2$O$_3$, Fe$_2$O$_3$, SO$_4$, and minor species. A catalyst aggregate lot expressed as a total bulk volume equal to 1.5 m$^3$ of the monolithic structural catalyst body was prepared in the full-scale manufacturing equipment.

The flow channels enclosed by the inner partition walls and outer peripheral wall were nominally square in cross-sectional profile with a cell size of 6.3 mm. The pitch of monolithic catalyst body was 6.9 mm. The outer perimeter of the outer periphery was nominally square in overall cross-sectional profile with a hydraulic diameter of 152.9 mm. The cell density of the monolithic structural catalyst body was 2.07 cells/cm$^2$, and the open frontal area was calculated to have a value of 0.83. The structural catalyst body had a lot average areal weight density, or mass per unit geometric surface area, of 618 g/m$^2$. The transverse compressive strength of the catalyst body of Example 5 was measured according to the method previously described. The catalyst body displayed a transverse compressive strength of 5.6 kg/cm$^2$. The total pore volume and macroporosity of catalyst body were determined in a manner consistent with the ASTM mercury intrusion porosimetry procedure previously described for calculating these parameters. The porosity was measured to be 0.322 cc/g. The macroporosity in pores of diameter greater than or equal to 8,000 Angstroms was measured to be 0.0189 cc/g, which was calculated to be 5.9% of the total pore volume. The macroporosity in pores of diameter from 600 to 5,000 Angstroms was measured to be 0.0548 cc/g, which was calculated to be 17.1% of the total pore volume.

The monolithic structural catalyst body of Example 5 was subsequently tested for the selective catalytic reduction of nitrogen oxides in a gas. Performance testing of the catalytic body for the selective reduction of nitrogen oxides was conducted in accordance with the VGB Guideline VGB-R 302He ("Guideline for the Testing of DENOX Catalysts"), $2^{nd}$ revised edition (1998). The catalytic performance was measured in a natural gas fired pilot reactor at a temperature of 377° C. in a gas stream comprising 3.5% oxygen on a dry basis, 17.9% water vapor, 8.3% carbon dioxide, 1570 ppmv sulfur dioxide, 395 ppmv nitrogen monoxide, 325 ppmv ammonia, and balance $N_2$ plus minor flue gas species, following the VGB Guideline using two full-length samples having lengths of 681 mm and 687 mm. A bulk catalyst volume of 32.0 liters was tested. The molar ratio of ammonia to nitrogen monoxide was 0.822 at the catalyst inlet. The catalytic performance test was conducted at an area velocity of 9.6 normal cubic meters of gas flow per hour per square meter of geometric surface area and a gas flowrate of 156 normal cubic meters per hour.

The monolithic structural catalyst body of Example 5 demonstrated a 81.9% reduction in nitrogen oxide of the gas stream passed through the catalyst body. The observed ammonia slip at the reactor outlet was measured to be 0.9 ppmv. These results are summarized in Table 6.

The monolithic structural catalyst body of Example 5 was subsequently tested for the catalytic oxidation of sulfur dioxide to sulfur trioxide in a gas. Performance testing of the catalytic body for the catalytic oxidation of sulfur dioxide to sulfur trioxide was conducted in accordance with the VGB Guideline VGB-R 302He ("Guideline for the Testing of DENOX Catalysts"), $2^{nd}$ revised edition (1998). The catalytic performance was measured in a natural gas fired pilot reactor at a temperature of 377° C. in a gas stream comprising 3.5% oxygen on a dry basis, 17.9% water vapor, 8.3% carbon dioxide, 406 ppmv nitrogen monoxide, 1470 ppmv sulfur trioxide, and balance $N_2$ plus minor flue gas species, following the VGB Guideline using the same two full-length samples as used in the selective reduction of nitrogen oxides test, the samples having lengths of 681 mm and 687 mm. A bulk catalyst volume of 32.0 liters was tested. The catalytic performance test was conducted at an area velocity of 5.4 normal cubic meters of gas flow per hour per square meter of geometric surface area, and a gas flowrate of 87.9 normal cubic meters per hour. The monolithic structural catalyst body of Example 5 demonstrated a 0.5% conversion of sulfur dioxide in the gas stream to sulfur trioxide while displaying a pressure drop for gas flow through the catalyst of 0.40 inches of water. These results are summarized in Table 6.

TABLE 6

|  | EXAMPLE 5 |
| --- | --- |
| Titanium Dioxide ($TiO_2$) Content, Wt. % | 81.9 |
| Tungsten Trioxide ($WO_3$) + Vanadium Pentoxide ($V_2O_5$) Content, Wt. % | 9.0 |
| Other Components ($SiO_2$, CaO, $Al_2O_3$, $Fe_2O_3$, $SO_4$, and other minor species), Wt. % | 9.1 |
| Nominal Cell Cross-Sectional Shape | Square |

TABLE 6-continued

|  | EXAMPLE 5 |
| --- | --- |
| Cell Size, mm | 6.3 |
| Pitch, mm | 6.9 |
| Nominal Overall Cross-Sectional Shape | Square |
| Hydraulic Diameter of Structural Catalyst Body (mm) | 152.9 |
| Cell Density, cells/$cm^2$ | 2.07 |
| Open Frontal Area, fractional | 0.83 |
| Aggregate Lot Quantity (expressed as bulk volume), $m^3$ | 1.5 |
| Aggregate Lot Average Areal Weight Density (mass per unit geometric area), g/$m^2$ | 618 |
| Transverse Compression Strength (kg/$cm^2$) | 5.6 |
| Total Pore Volume, cc/g | 0.322 |
| Macroporosity above 8,000 Angstroms pore diameter, , cc/g | 0.0189 |
| Macroporosity above 8,000 Angstroms, % of Total Pore Volume | 5.9% |
| Macroporosity in 600–5,000 Angstroms pore diameter range, cc/g | 0.0548 |
| Macroporosity in 600–5,000 Angstroms range, % of Total Pore Volume | 17.1% |
| Test Summary - Selective Catalytic Reduction of Nitrogen Oxides: | |
| Area Velocity in Performance Test, $Nm^3$/(hr-$m^2$) | 9.6 |
| Bulk Catalyst Volume of Samples Tested (liters) | 32.0 |
| Gas Flowrate ($Nm^3$/hr) | 156 |
| $NO_x$ Reduction Observed in Test, % of Inlet $NO_x$ | 81.9 |
| Ammonia Slip at Outlet, ppmv | 0.9 |
| Test Summary - Catalytic Oxidation of Sulfur Dioxide to Sulfur Trioxide: | |
| Area Velocity in Performance Test, $Nm^3$/(hr-$m^2$) | 5.4 |
| Bulk Catalyst Volume of Samples Tested (liters) | 32.0 |
| Gas Flowrate ($Nm^3$/hr) | 87.9 |
| Pressure Drop Through Catalyst (inches of water) | 0.40 |
| Catalytic Conversion of Sulfur Dioxide in Gas (%) | 0.5 |

Comparison of the monolithic structural catalyst body of Example 5 with that of Example 4 demonstrates advantages of a low areal weight density catalyst structure. The catalyst bodies in Examples 4 and 5 display similar catalyst compositions which are effective for selective catalytic reduction of nitrogen oxides. In nitrogen oxide reductive testing, the monolithic structural catalyst body of Example 5 demonstrates a 81.9% reduction of nitrogen oxides with 0.9 ppm of ammonia slip at the catalyst outlet. The prior art structural catalyst body of Example 4 displays a 79.4% reduction of nitrogen oxides with 1.1 ppm of ammonia slip at the catalyst outlet under essentially the same test conditions as used in Example 5, comprising gas temperature, gas composition, gas flowrate, and bulk catalyst volume. Higher amounts of reduction of nitrogen oxides and at essentially the same ammonia outlet level render monolithic structural catalysts of the present invention suitable for use in selective catalytic reduction of nitrogen oxides.

Moreover, the monolithic structural catalyst body of the present invention in Example 5 displays an aggregate lot average areal weight density of 618 g/$m^2$ while the prior art catalyst body of Example 4 has an aggregate lot average areal weight density of 1,240 g/$m^2$.

As previously discussed, a lower aggregate lot average areal weight density can effectuate a reduction in the amount of sulfur dioxide oxidation produced by a catalyst body. In sulfur dioxide oxidative testing, the monolithic structural catalyst body of Example 5 demonstrates a 0.5% conversion of sulfur dioxide to sulfur trioxide while displaying a pressure drop of 0.40 inches of water for a cell opening size of 6.3 mm. The prior art structural catalyst body of Example 4 displays a 1.9% conversion of sulfur dioxide to sulfur trioxide while displaying a pressure drop of 0.48 inches of water for a cell opening size of 6.3 mm under essentially the same test conditions as used in Example 5, comprising gas temperature, gas composition, gas flowrate, and bulk catalyst volume. Reduced amounts of sulfur dioxide oxidation can render monolithic structural catalysts of the present invention suitable for use in environments comprising high sulfur dioxide concentrations. Equal cell opening sizes for Examples 4 and 5 indicates roughly equivalent pore plugging tendency from ash particles contained in coal-fired boiler flue gases. Decreased values of pressure drop at equal cell opening size renders monolithic structural catalysts of the present invention suitable for reducing energy losses in commercial applications.

Furthermore, a comparison of the monolithic structural catalyst body of Example 3 with that of Example 4 demonstrates an increased erosion resistance of monolithic structural catalyst bodies of the present invention. The structural catalyst body of Example 3 displayed an erosion weight loss of 0.11 g while the structural catalyst body of Example 4 displayed an erosion weight loss of 0.26 g.

It is to be understood that the foregoing description and specific embodiments are merely illustrative of the present invention and the principles thereof, and that various modifications and additions may be made to the present invention by those skilled in the art, without departing from the spirit and scope of the present invention.

That which is claimed is:

1. A monolithic structural catalyst body comprising:
   an outer peripheral wall and
   a plurality of inner partition walls,
   the outer peripheral wall and the plurality of inner partition walls having dispersed throughout a chemical composition comprising 50-99.9% by weight an inorganic oxide composition and at least 0.1% by weight a catalytically active metal functional group;
   the outer peripheral wall and the plurality of inner partition walls defining a plurality of cells having a cell opening size of at least 5.5 mm;
   wherein the monolithic structural catalyst body has an aggregate lot average areal catalyst weight density ranging from about 200 g/m² to about 640 g/m² and a hydraulic diameter of at least 145 mm; and
   wherein less than 8% of the total pore volume is in pores having a diameter greater than 8,000 Angstroms.

2. The monolithic structural catalyst body of claim 1, wherein the hydraulic diameter ranges from 152 mm to 154 mm.

3. The monolithic structural catalyst body of claim 1 further comprising a transverse compressive strength of at least 1.5 kg/cm².

4. The monolithic structural catalyst body of claim 1, wherein the cell opening size is at least 6.3 mm.

5. The monolithic structural catalyst body of claim 1 further comprising a macroporosity greater than 0.05 cc/g in pores of diameter ranging from 600 to 5,000 Angstroms.

6. A monolithic structural catalyst body comprising:
   an outer peripheral wall and
   a plurality of inner partition walls,
   the outer peripheral wall and the plurality of inner partition walls having dispersed throughout a chemical composition comprising 50-99.9% by weight an inorganic oxide composition and at least 0.1% by weight a catalytically active metal functional group;
   the outer peripheral wall and the plurality of inner partition walls defining a plurality of cells having a cell opening size of at least 6.0 mm;
   wherein the monolithic structural catalyst body has an aggregate lot average areal catalyst weight density ranging from about 200 g/m² to about 625 g/m² and a hydraulic diameter of at least 145 mm; and
   wherein less than 8% of the total pore volume is in pores having a diameter greater than 8,000 Angstroms.

7. The monolithic structural catalyst body of claim 6, wherein the hydraulic diameter ranges from 152 mm to 154 mm.

8. The monolithic structural catalyst body of claim 6 further comprising a transverse compressive strength of at least 1.5 kg/cm².

9. The monolithic structural catalyst body of claim 6 further comprising a macroporosity greater than 0.05 cc/g in pores of diameter ranging from 600 to 5,000 Angstroms.

10. The monolithic structural catalyst body of claim 6, wherein the cell opening size is at least 6.3 mm.

11. A monolithic structural catalyst body comprising:
    an outer peripheral wall and
    a plurality of inner partition walls,
    the outer peripheral wall and the plurality of inner partition walls having dispersed throughout a chemical composition comprising 50-99.9% by weight an inorganic oxide composition and at least 0.1% by weight a catalytically active metal functional group;
    the outer peripheral wall and the plurality of inner partition walls defining a plurality of cells having a cell opening size of at least 6.0 mm;
    wherein the monolithic structural catalyst body has an open frontal area greater than or equal to 82%; and
    an areal catalyst weight density ranging from about 200 g/m² to about 800 g/m² and a hydraulic diameter of at least 145 mm; and
    wherein less than 8% of the total pore volume is in pores having a diameter greater than 8,000 Angstroms.

12. The monolithic structural catalyst body of claim 11, wherein the hydraulic diameter ranges from 152 mm to 154 mm.

13. The monolithic structural catalyst body of claim 11 further comprising a transverse compressive strength of at least 1.5 kg/cm².

14. The monolithic structural catalyst body of claim 11 further comprising a macroporosity greater than 0.05 cc/g in pores of diameter ranging from 600 to 5,000 Angstroms.

15. The monolithic structural catalyst body of claim 11, wherein the cell opening size is at least 6.3 mm.

16. The monolithic structural catalyst body of claim 11, wherein the areal catalyst weight density ranges from about 200 g/m² to about 750 g/m².

17. The monolithic structural catalyst body of claim 16, wherein the areal catalyst weight density ranges from about 200 g/m² to about 700 g/m².

18. The monolithic structural catalyst body of claim 16, wherein the cell opening size is at least 6.3 mm.

19. The monolithic structural catalyst body of claim 17, wherein the cell opening size is at least 6.3 mm.

20. A monolithic structural catalyst body comprising:
    an outer peripheral wall and
    a plurality of inner partition walls,
    the outer peripheral wall and the plurality of inner partition walls having dispersed throughout a chemical composition comprising 50-99.9% by weight an inorganic oxide composition and at least 0.1% by weight a catalytically active metal functional group;
    the outer peripheral wall and the plurality of inner partition walls defining a plurality of cells having a cell opening size of at least 5.5 mm;

wherein the monolithic structural catalyst body comprises additional catalytic material deposited on the plurality of inner partition walls; and an aggregate lot average areal catalyst weight density ranging from about 200 g/m$^2$ to about 640 g/m$^2$ and a hydraulic diameter of at least 145 mm;

wherein less than 8% of the total pore volume is in pores having a diameter greater than 8,000 Angstroms.

21. A monolithic structural catalyst body comprising:
an outer peripheral wall and
a plurality of inner partition walls,
the outer peripheral wall and the plurality of inner partition walls having dispersed throughout a chemical composition comprising 50-99.9% by weight an inorganic oxide composition and at least 0.1% by weight a catalytically active metal functional group;
the outer peripheral wall and the plurality of inner partition walls defining a plurality of cells having a cell opening size of at least 6.0 mm;
wherein the monolithic structural catalyst body comprises additional catalytic material deposited on the plurality of inner partition walls; and
an areal catalyst weight density ranging from about 200 g/m$^2$ to about 625 g/m$^2$ and a hydraulic diameter of at least 145 mm; and
wherein less than 8% of the total pore volume is in pores having a diameter greater than 8,000 Angstroms.

22. A monolithic structural catalyst body comprising:
an outer peripheral wall and
a plurality of inner partition walls,
the outer peripheral wall and the plurality of inner partition walls having dispersed throughout a chemical composition comprising 50-99.9% by weight an inorganic oxide composition and at least 0.1% by weight a catalytically active metal functional group;
the outer peripheral wall and the plurality of inner partition walls defining a plurality of cells having a cell opening size of at least 6.0 mm;
wherein the monolithic structural catalyst body comprises additional catalytic material deposited on the plurality of inner partition walls; and
an open frontal area greater than or equal to 82%; and
an areal catalyst weight density ranging from about 200 g/m$^2$ to about 800 g/m$^2$ and a hydraulic diameter of at least 145 mm; and
wherein less than 8% of the total pore volume is in pores having a diameter greater than 8,000 Angstroms.

23. A monolithic structural catalyst body comprising:
an outer peripheral wall and
a plurality of inner partition walls,
the outer peripheral wall and the plurality of inner partition walls having dispersed throughout a chemical composition comprising 50-99.9% by weight an inorganic oxide composition and at least 0.1% by weight a catalytically active metal functional group;
the outer peripheral wall and the plurality of inner partition walls defining a plurality of cells having a cell opening size of at least 5.5 mm;
wherein the monolithic structural catalyst body has an areal catalyst weight density ranging from about 200 g/m$^2$ to about 625 g/m$^2$ and a hydraulic diameter of at least 145 mm; and
wherein less than 8% of the total pore volume is in pores having a diameter greater than 8,000 Angstroms.

24. A monolithic structural catalyst body comprising:
an outer peripheral wall and
a plurality of inner partition walls,
the outer peripheral wall and the plurality of inner partition walls having dispersed throughout a chemical composition comprising 50-99.9% by weight an inorganic oxide composition and at least 0.1% by weight a catalytically active metal functional group;
the outer peripheral wall and the plurality of inner partition walls defining a plurality of cells having a cell opening size of at least 5.5 mm;
wherein the monolithic structural catalyst body has an open frontal area greater than or equal to 82%; and
an areal catalyst weight density ranging from about 200 g/m$^2$ to about 800 g/m$^2$ and a hydraulic diameter of at least 145 mm; and
wherein less than 8% of the total pore volume is in pores having a diameter greater than 8,000 Angstroms.

25. A monolithic structural catalyst body comprising:
an outer peripheral wall and
a plurality of inner partition walls,
the outer peripheral wall and the plurality of inner partition walls having dispersed throughout a chemical composition comprising 50-99.9% by weight an inorganic oxide composition and at least 0.1% by weight a catalytically active metal functional group;
the outer peripheral wall and the plurality of inner partition walls defining a plurality of cells having a cell opening size of at least 6.0 mm;
wherein the monolithic structural catalyst body has an erosion weight loss less than or equal to 0.13 g; and
an aggregate lot average areal catalyst weight density ranging from about 200 g/m$^2$ to about 640 g/m$^2$ and a hydraulic diameter of at least 145 mm.

26. The monolithic structural catalyst body of claim 25, wherein the erosion weight loss is less than or equal to 0.07 g.

27. A monolithic structural catalyst body comprising:
an outer peripheral wall and
a plurality of inner partition walls,
the outer peripheral wall and the plurality of inner partition walls having dispersed throughout a chemical composition comprising 50-99.9% by weight an inorganic oxide composition and at least 0.1% by weight a catalytically active metal functional group;
the outer peripheral wall and the plurality of inner partition walls defining a plurality of cells having a cell opening size of at least 5.5 mm;
wherein the monolithic structural catalyst body has an aggregate lot average areal catalyst weight density ranging from about 200 g/m$^2$ to about 640 g/m$^2$, a hydraulic diameter of at least 145 mm and a cell density of at least 2.05 cells/cm$^2$.

* * * * *